2,757,117
Patented July 31, 1956

2,757,117
N,N',N''-HEXAALKYLPHOSPHOROHALOGENIDO-TRIAMIDOTHIOIC ACID ESTERS

Gail H. Birum, Dayton, Ohio, assignor to Monsanto Chemical Company, St. Louis, Mo., a corporation of Delaware No Drawing. Application February 8, 1955,
Serial No. 487,000

19 Claims. (Cl. 167—22)

The present invention relates to organic phosphorus compounds, and more particularly to products of the reaction of hexaalkylphosphorous triamides and substituted sulfenyl halides, methods of producing the same, and biological toxicant compositions comprising the new compounds.

According to the invention, there are prepared new and valuable compounds which are the products of the reaction of hexaalkylphosphorous triamides and substituted phosphorous triamide having from 1 to 4 carbon atoms in the alkyl radical, and a sulfenyl halide of the formula $$X_n-R-S-X$$
$$\quad\quad |$$
$$\quad (NO_2)_m$$

in which R is a hydrocarbon radical free of non-benzenoid unsaturation and containing from 1 to 6 carbon atoms, X is a halogen atom, $n$ is an integer of from 0 to 3, $m$ is an integer of from 0 to 2, and the sum of $n+m$ is at least equal to 1.

The hexaalkylphosphorous triamides are known compounds which are readily obtainable by reaction of the appropriate dialkylamine with phosphorous trichloride. As examples of useful hexaalkylphosphorous triamides may be mentioned hexamethylphosphorous triamide, hexaethylphosphorous triamide, hexa-$n$-propylphosphorous triamide, hexa-iso-butylphosphorous triamide, and such mixed hexaalkylphosphorous triamides as tetramethyldiethylphosphorous triamide, dimethyldiethyldibutylphosphorous triamide, etc. As examples of useful halogen-substituted sulfenyl halides may be mentioned 2-, 3-, or 4-chlorobenzenesulfenyl chloride, 2-, 3-, or 4-fluorobenzenesulfenyl chloride, 2-, 3-, or 4-iodobenzenesulfenyl chloride, 2,3-, 3,4-, or 2,4-dibromobenzenesulfenyl chloride, 2,4,6-trichlorobenzenesulfenyl chloride, trichloromethanesulfenyl chloride, dichloromethanesulfenyl chloride, 2-chlorocyclohexanesulfenyl chloride, 2-iodoethanesulfenyl chloride, 2-chloroethanesulfenyl chloride, 2-chloropentanesulfenyl chloride, etc. Examples of useful nitro-substituted hydrocarbon sulfenyl halides are 2-, 3-, or 4-nitrobenzenesulfenyl chloride, 2,4-dinitrobenzenesulfenyl chloride, and 2-nitropropanesulfenyl chloride. An example of a presently useful sulfenyl halide having both nitro and halogen substituents is 4-chloro-2-nitrobenzenesulfenyl chloride.

The products of the stoichiometric reaction of the hexaaklylphosphorous triamides with the substituted hydrocarbon sulfenyl halides are phosphorous compounds having the formula

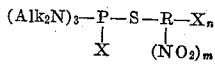

in which Alk is an alkyl radical containing from 1 to 4 carbon atoms, R is an alkyl or aryl radical containing from 1 to 6 carbon atoms, X is halogen, $n$ is an integer of from 0 to 3, $m$ is an integer of from 0 to 2, and the sum of $n + m$ is at least equal to 1. Compounds of this type may be designated as esters of an N,N',N''-hexaalkyl-phosphorohalogenidotriamidothioic acid.

Reaction of the hexaalkylphosphorous triamides with the sulfenyl halides to give the present S-alkyl or S-aryl N - hexaalkylphosphorohalogenidotriamidothioates proceeds in accordance with the following reaction scheme:

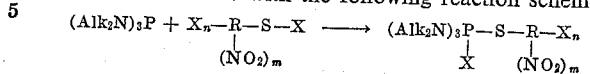

Thus, reaction of an o-nitrobenzenesulfenyl halide with a hexaalkylphosphorous triamide gives a S-nitrophenyl N,N',N'' - hexaalkylphosphorohalogenidotriamidothioate; and reaction of a halobenzenesulfenyl chloride with hexamethylphosphorous triamide gives an S-halophenyl N,N',N''-hexamethylphosphorochloridotriamidothioate.

The present phosphorohalogenidotriamidothioic acid esters are generally stable, well-defined products, which are usually water-soluble, and may be used for a wide variety of industrial and agricultural purposes. They may be useful, for example, depending on the nature of the compounds, as surfactants, as textile-treating agents, as anti-static agents, etc. The more highly halogenated, short-chain alkyl-substituted compounds may be useful, for example, as fire-proofing agents. The present compounds are particularly valuable as biological toxicants, e. g., as insecticides and nematocides.

In preparing the present substituted phosphorothioic acid esters, I prefer to operate substantially as follows: The hexaalkylphosphorous triamide is contacted with the sulfenyl halide at ordinary, decreased or increased temperatures until formation of the phosphorothioic acid ester has occurred. Depending on the individual reactants employed, as well as on the quantities used, heating or cooling of the mixture of reactants may or may not be required. In many cases, formation of the products takes place spontaneously, and the separation of the product as a precipitate may be observed even during the addition of one reactant to the other. Evolution of heat may occur, and it is often advantageous to keep the reaction temperature low, by external cooling, to moderate the reaction until addition of the reactants is complete. For example, in the gradual addition of hexamethylphosphorous triamide to p-chlorobenzenesulfenyl chloride cooled to 5–15° C., a precipitate of the product begins to form immediately during addition of the triamide. After addition of the reactants is complete, the temperature of the reaction mixture may be raised to room temperature or above, to ensure completion of the reaction. In order to dissipate reaction heat, it may be desirable to work in the presence of an inert diluent or solvent. Such solvents or diluents may be, e. g., benzene, toluene, hexane, etc. An excess of either reactant and gradual introduction of the other may also result in smoother operation. The reaction may also be effected at increased or diminished pressure or in the presence of a catalyst, if desirable; however, the ease of the reaction at ordinary atmospheric pressure and in the absence of catalysts generally requires no control of the reaction by pressure variation or acceleration thereof by catalytic means.

The present invention is further illustrated, but not limited, by the following examples:

Example 1

Benzene (200 ml.) and 18.9 g. (0.1 mol) of o-nitrobenzenesulfenyl chloride were placed in a 500 ml. 4-neck flask equipped with stirrer, thermometer and condenser, and the flask was cooled in an ice bath. A total of 16.3 g. (0.1 mol) of hexamethylphosphorous triamide was then added to the flask during a time of 0.3 hr., while the temperature of the reaction mixture was held at 5–10°. A red solid formed during the addition of the triamide; on warming the mixture to room temperature, at the close of the reaction, the color changed to tan, and there was no further change in color on heating to 75°. Cooling to room temperature, filtration, and two washings with benzene gave a light tan solid. After drying at 0.2 mm. for 0.75 hour and then standing overnight, there was obtained 32.8 g. (93% theoretical yield) of S-(o-nitrophenyl) N,N',N''-hexamethylphosphorochloridotriamidothioate, melting at 139–141° C., insoluble in benzene and soluble in water, and analyzing as follows:

|  | Found | Calcd. for $C_{12}H_{22}ClN_4O_2PS$ |
|---|---|---|
| Percent N | 15.24 | 15.9 |
| Percent P | 8.76 | 8.8 |
| Percent Cl | 10.36 | 10.05 |

This compound was found to be effective against Mexican bean bettle larvae.

*Example 2*

Fifty ml. of benzene and 17.9 g. (0.1 mol) of p-chlorobenzenesulfenyl chloride were placed in a 4-neck flask equipped with stirrer, thermometer and condenser, and the reaction mixture was held at 5–15° while hexamethylphosphorous triamide was added until the sulfenyl chloride was decolorized. About 14.5 g. of the triamide was required for this decolorization. A white solid separated from the mixture during the reaction. After standing overnight at room temperature, the reaction mixture was filtered and washed twice with benzene; the solid thus obtained was dried in a desiccator for 2 hours at 0.2 mm., giving 30.5 g. (89% theoretical yield) of white, crystalline S-(p-chlorophenyl) N,N',N''-hexamethylphosphorochloridotriamidothioate, melting at 145–147° C., insoluble in benzene and soluble in water, and analyzing as follows:

|  | Found | Calcd. for $C_{12}H_{22}Cl_2N_3PS$ |
|---|---|---|
| Percent N | 11.46 | 12.2 |
| Percent P | 10.19 | 9.1 |
| Percent Cl | 21.40 | 20.7 |

*Example 3*

A mixture of 27.9 g. (0.15 mol) of trichloromethanesulfenyl chloride, 100 ml. of benzene and 100 ml. of hexane was placed in a 4-neck flask provided with a thermometer, a stirrer, reflux condenser, and dropping funnel. While the mixture was held at a temperature of −20° to −30° C., a total of 24.5 g. (0.15 mol) of hexamethylphosphorous triamide was added to the flask over a period of 0.3 hour. A solid began separating immediately during this addition. After completion of the addition of the triamide, the reaction mixture was warmed to 55° C., let cool to room temperature and filtered. The tan, solid filtration residue was washed twice with benzene and dried at 1 mm. for 2 hours, giving 34.8 g. of a hygroscopic tan material comprising S-trichloromethyl N,N'N''-hexamethylphosphorochloridotriamidothioate.

This compound showed effectiveness in tests against milkweed bug, Mexican bean bettle larvae, spotted mite, and Epilachna larvae.

*Example 4*

Nematocidal evaluation of the S-(p-chlorophenyl) N,N',N''-hexamethylphosphorochloridotriamidothioate of Example 2 was conducted as follows:

The compound was introduced at a concentration of 0.1 per cent into an aqueous culture of the nematode *Panagrellus redivivis*. It is known that a nematode, when placed in water, flexes its body at a more or less constant rate and that the effect of a nematocide can be estimated reasonably accurately by counting the rate of this flexing action. This motility was observed through a microscope and the number of flexures was counted, the effect of the nematocide being expressed as a percentage of the normal flexing rate of a control dispersion not containing a nematocidal agent. The following table sets forth the motility of the nematode as compared to a "control" culture of nematodes which was identical to the test culture except for the S-(p-chlorophenyl) N,N',N''-hexamethylphosphorochloridotriamidothioate content:

| Motility after— | Culture containing the test phosphorous compound | Control Cultures |
|---|---|---|
|  | *Percent* | *Percent* |
| 10 minutes | 95 | 100 |
| 20 minutes | 95 | 100 |
| 30 minutes | 95 | 100 |
| 60 minutes | 75 | 100 |
| 2 hours | 75 | 100 |
| 24 hours | 0 | 100 |

Testing of the S-(o-nitrophenyl) N,N',N''-hexamethylphosphorochloridotriamidothioate of Example 1 was conducted similarly, and this compound was also found effective against nematodes.

Other phosphorus compounds effective as insecticides, nematocides, etc., are prepared, for example, by reacting chloropentanesulfenyl chloride with hexaethylphosphorous triamide to give S-chloroamyl N,N',N''-hexaethylphosphorochloridotriamidothioate; by reacting hexa-n-propylphosphorous triamide with 4-chloro-2-nitro-benzene-sulfenyl chloride to give S-(4-chloro-2-nitrophenyl) N,N',N'' - hexa-n-propylphosphorochloridotriamidothioate; by reacting 2,4,6-tribromobenzenesulfenyl bromide with hexamethylphosphorous triamide to give S-(2,4,6-tribromophenyl) N,N',N'' - hexamethylphosphorobromidotriamidothioate; by reacting trichloromethanesulfenyl chloride with tetramethyldiethylphosphorous triamide to give S-trichloromethyl N,N'-tetramethyl-N''-diethylphosphorochloridotriamidothioate.

What I claim is:

1. The addition product of a hexaalkylphosphorous triamide with a sulfenyl halide, said addition product having the formula

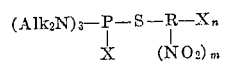

in which Alk is an alkyl radical containing from 1 to 4 carbon atoms, R is selected from the class consisting of alkyl radicals of from 1 to 6 carbon atoms and the phenyl radical, X is a halogen, $n$ is an integer of from 0 to 3, $m$ is an integer of from 0 to 2, and the sum of $m + n$ is at least equal to 1.

2. A chlorophenyl ester of an N,N',N''-hexaalkylphosphorohalogenidotriamidothioic acid having from 1 to 4 carbon atoms in the alkyl radicals and from 1 to 3 chlorine atoms in the phenyl radical.

3. A nitrophenyl ester of an N,N'N''-hexaalkylphosphorohalogenidotriamidothioic acid having from 1 to 4 carbon atoms in the alkyl radicals and from 1 to 2 nitro substituents in the phenyl ring.

4. A chloroalkyl ester of an N,N',N''-hexaalkylphosphorohalogenidotriamidothioic acid having from 1 to 4 carbon atoms in the alkyl radicals, and said chloroalkyl radical containing from 1 to 6 carbon atoms and from 1 to 3 chlorine atoms.

5. A nitroalkyl ester of an N,N',N''-hexaalkylphosphorohalogenidotriamidothioic acid having from 1 to 4 carbon atoms in said alkyl radicals, and said nitroalkyl radical containing from 1 to 6 carbon atoms and from 1 to 2 nitro substituents.

6. S-(o-nitrophenyl) N,N',N''-hexamethylphosphorochloridotriamidothioate.

7. S-(p-chlorophenyl) N,N',N''-hexamethylphosphorochloridotriamidothioate.

8. S-trichloromethyl N,N',N''-hexamethylphosphorochloridotriamidothioate.

9. The method which comprises contacting a hexaalkylphosphorous triamine having from 1 to 4 carbon atoms in the alkyl radicals with a sulfenyl halide of the formula $$X_n-R-S-X$$
$$\quad\quad\;\;|$$
$$\;\;(NO_2)_m$$

in which R is a member of the class consisting of alkyl radicals containing from 1 to 6 carbon atoms and the phenyl radical, X is halogen, $n$ is an integer of from 0 to 3, $m$ is an integer of from 0 to 2, and the sum of $n+m$ is at least equal to 1, and recovering from the product an ester of a phosphorothioic acid having the formula $$(Alk_2N)_3-P-S-R-X_n$$
$$\quad\quad\quad\quad\;\;|\quad\quad\;|$$
$$\quad\quad\quad\quad\;X\quad(NO_2)_m$$

in which Alk is an alkyl radical of from 1 to 4 carbon atoms, and R, X, $m$ and $n$ are as hereinbefore defined.

10. The method which comprises contacting a hexaalkylphosphorous triamide having from 1 to 4 carbon atoms in the alkyl radicals with a chlorobenzenesulfenyl halide containing from 1 to 3 chlorine substituents on the benzene ring, and recovering from the reaction product a S-chlorophenyl N,N′,N″-hexaalkylphosphorohalogenidotriamidothioate having from 1 to 4 carbon atoms in the alkyl radicals and from 1 to 3 chlorine substituents on the phenyl ring.

11. The method which comprises contacting a hexaalkylphosphorous triamide having from 1 to 4 carbon atoms in the alkyl radicals with a nitrobenzenesulfenyl halide containing from 1 to 2 nitro substituents on the benzene ring, and recovering from the reaction product a S-nitrophenyl N,N′,N″-hexaalkylphosphorohalogenidotriamidothioate having from 1 to 4 carbon atoms in the alkyl radicals and from 1 to 2 nitro substituents on the phenyl ring.

12. The method which comprises contacting a hexaalkylphosphorous triamide having from 1 to 4 carbon atoms in the alkyl radicals with a chloroalkanesulfenyl halide, said chloroalkanesulfenyl halide containing from 1 to 6 carbon atoms and from 1 to 3 chlorine substituents on the alkane carbon atoms, and recovering from the reaction products a S-chloroalkyl N,N′,N″-hexaalkylphosphorohalogenidotriamidothioate, said alkyl radicals containing from 1 to 4 carbon atoms, and said chloroalkyl radical containing from 1 to 6 carbon atoms and from 1 to 3 chlorine atoms.

13. The method which comprises contacting a hexaalkylphosphorous triamide having from 1 to 4 carbon atoms in the alkyl radicals with a nitroalkanesulfenyl halide containing from 1 to 6 carbon atoms and from 1 to 2 nitro substituents on the alkane carbon atoms, and recovering from the reaction products a S-nitroalkyl N,N′,N″ - hexaalkylphosphorohalogenidotriamidothioate said alkyl radicals containing from 1 to 4 carbon atoms, and said nitroalkyl radical containing from 1 to 6 carbon atoms and from 1 to 2 nitro substituents.

14. The method which comprises contacting hexamethylphosphorous triamide with p-chlorobenzenesulfenyl chloride and recovering from the reaction products S-(p-chlorophenyl) N,N′,N″ - hexamethylphosphorochloridotriamidothioate.

15. The method which comprises contacting hexamethylphosphorous triamide with o-nitrobenzenesulfenyl chloride, and recovering from the reaction mixture S-(o-nitrophenyl) N,N′,N″ - hexamethylphosphorochloridotriamidothioate.

16. The method which comprises contacting hexamethylphosphorus triamide with trichloromethanesulfenyl chloride, and recovering from the reaction mixture S-trichloromethyl N,N′,N″ - hexamethylphosphorochloridotriamidothioate.

17. A biological toxicant comprising an inert carrier and as the essential effective ingredient the addition product of a hexaalkylphosphorous triamide with a sulfenyl halide, said addition product having the formula $$(Alk_2N)_3-P-S-R-X_n$$
$$\quad\quad\quad\quad\;\;|\quad\quad\;|$$
$$\quad\quad\quad\quad\;X\quad(NO_2)_m$$

in which Alk is an alkyl radical containing from 1 to 4 carbon atoms, R is selected from the class consisting of alkyl radicals of from 1 to 6 carbon atoms and the phenyl radical, X is halogen, $n$ is an integer of from 0 to 3, $m$ is an integer of from 0 to 2, and the sum of $m+n$ is at least equal to 1.

18. The method of controlling the growth of living organisms which comprises exposing said living organisms to a toxic quantity of a biological toxicant composition comprising as the essential effective ingredient the addition product of a hexaalkylphosphorous triamide with a sulfenyl halide, said addition product having the formula $$(Alk_2N)_3-P-S-R-X_n$$
$$\quad\quad\quad\quad\;\;|\quad\quad\;|$$
$$\quad\quad\quad\quad\;X\quad(NO_2)_m$$

in which Alk is an alkyl radical containing from 1 to 4 carbon atoms, R is selected from the class consisting of alkyl radicals of from 1 to 6 carbon atoms and the phenyl radical, X is halogen, $n$ is an integer of from 0 to 3, $m$ is an integer of from 0 to 2, and the sum of $m+n$ is at least equal to 1.

19. The method of controlling nematodes which comprises exposing said nematodes to a toxic quantity of a nematocidal composition comprising as the essential ingredient S-(p-chlorophenyl) N,N′,N″-hexamethylphosphorochloridotriamidothioate.

No references cited.